United States Patent [19]

Gössmann et al.

[11] Patent Number: 4,558,502

[45] Date of Patent: Dec. 17, 1985

[54] PROCESS AND APPARATUS FOR ASSEMBLING UNIVERSAL JOINTS

[75] Inventors: Willi Gössmann, Niederwerrn; Gebhard Pape, Schweinfurt; Norbert Klüpfel, Hambach; Emil Ludwig, Sennfeld; Josef Stark, Hambach; Bernhard Bauer, Hassfurt; Hans Freund, Schwebheim, all of Fed. Rep. of Germany

[73] Assignee: SKF Kugellagerfabriken GmbH, Schweinfurt, Fed. Rep. of Germany

[21] Appl. No.: 651,465

[22] Filed: Sep. 17, 1984

[30] Foreign Application Priority Data

Sep. 17, 1983 [DE] Fed. Rep. of Germany ....... 3333665

[51] Int. Cl.[4] .................. B23P 11/00; B23P 19/04
[52] U.S. Cl. ................................. 29/434; 29/252; 29/464; 29/525
[58] Field of Search ............... 29/252, 244, 434, 464, 29/525, 559

[56] References Cited

U.S. PATENT DOCUMENTS

| 3,230,617 | 1/1966 | Spiess et al. | 29/252 UX |
| 3,429,021 | 2/1969 | Spiess | 29/434 X |
| 3,786,544 | 1/1974 | Ferguson | 29/434 X |

FOREIGN PATENT DOCUMENTS

| 580082 | 11/1977 | U.S.S.R. | 29/252 |
| 904963 | 2/1982 | U.S.S.R. | 29/434 |

Primary Examiner—Howard N. Goldberg
Assistant Examiner—Ronald S. Wallace
Attorney, Agent, or Firm—Eugene E. Renz, Jr.

[57] ABSTRACT

A method for the assembly of universal joints with radially pretensioned fork arms, consisting of the steps of inserting and positioning the joint cross in the joint fork, pressing in the bearing and fixing them by means of pressure units, one of which supports each fork arm and pretensioning each fork arm individually during the entire pressing-in and/or fixing phase by means of the tipping force resulting from the pressure prevailing between the support element and the pressing/peening tool, reduced by a partial force following in response to the amount of the pressing force.

7 Claims, 1 Drawing Figure

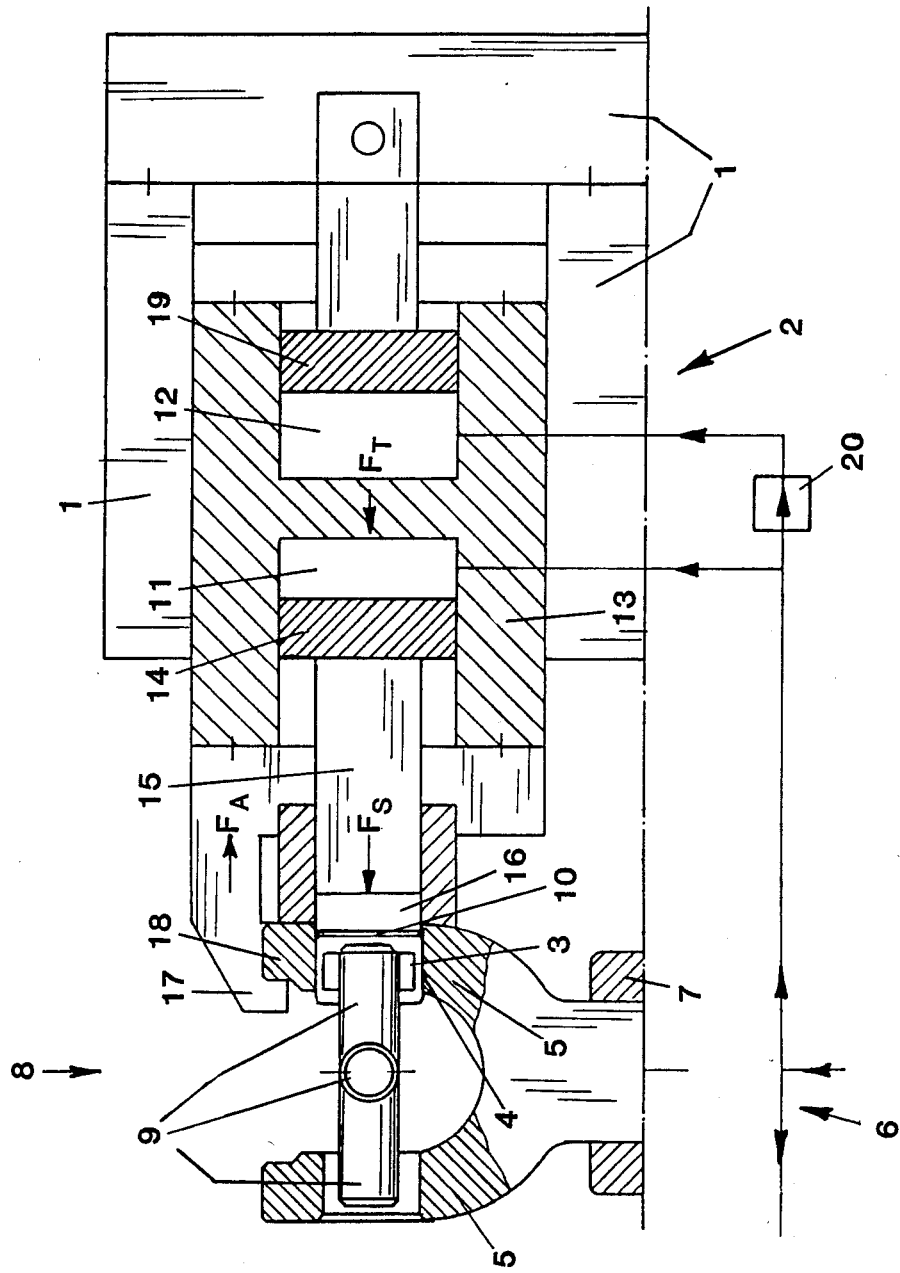

PROCESS AND APPARATUS FOR ASSEMBLING UNIVERSAL JOINTS

SUMMARY OF THE INVENTION

The invention pertains to a method and apparatus for the assembly of universal joints. In order to reduce the error of misaligned centers of the two joint forks or jointed shafts with respect to each other, the pretension of the fork arms is kept the same throughout the entire assembly procedure. This is achieved in that the fork arms are spread apart solely by the force exerted during the pressing or wedging and in that the spread is reduced to the required value by means of a partial force which is proportional to the pressing force and is supported against the machine stand. In this way, the amount of pretension is independent of manufacturing tolerances and of differences in cross section of the fork arms and different press-fits of the bearings in the bores; this means that minimal center misalignment errors and uniform bending moments between the joint forks are achieved.

BACKGROUND OF THE INVENTION

The present invention relates to a method and apparatus for assembling universal joints.

Universal joints and method for assembling them are not new per se. For example, in West German Offenlegunsschrift No. 1,527,557, the bearings are pressed into the bearing bores of the fork of a joint fork by means of floating pressure units without any reactive force and fixed in place axially, for example, by peening. The joint cross in these assemblies is positioned so that after the pressing and peening operation a finished mounting results. It is desirable in these assemblies that the joint cross not have any axial play and should have a braking moment in the pivoting direction, which moment is often called the bending moment. The bending moment is obtained by reason of the fact that the bearings are fixed in place while the pretensioned forks are spread apart and the bottoms of the cups of these bearings are in contact with the universal joint pins. In presently known assemblies, the bearings are first pressed simultaneously into the bearing bores and during this process, the forks are supported from behind in each instance by a hook-like support element attached to the pressure unit so that the pressure can thus act on the bearings without any reaction from the pressing tool. Thus, when the bearings in these known assemblies are in contact with the pins of the joint cross, a further application of pressure causes the forks to spread whereby the floating pressure units are activated outwardly. The displacement distance is limited by adjustable stops wherein the pretension obtained by means of the spreading distance of the fork arms can be determined in advance.

A particular disadvantage of the above described prior known universal joint assemblies and the method for assembling them is that since manufacturing tolerances result in cross sectional and/or structural differences between the two fork arms (the joint fork in cross section is an unworked casting), these differences result in different restorative forces or pretensions in the fork arms even if the arms are spread by the same amount. The difference between the restorative forces acts by way of the bearings directly on the joint cross and shifts the joint cross out of its precentered position. This results in an impermissible misalignment of the centers of the two joint parts with respect to each other which can no longer be optimally compensated even by balancing these parts individually since the joint parts must be bent toward each other in order to function properly.

The differences between restorative forces also produces large differences in the bending moment from one joint to the next. This defect is aggravated even more by the unavoidable manufacturing tolerances of the joint forks amongst themselves and not merely between the fork arms of a single joint fork.

Further disadvantages of the prior known designs are evident when differences occur in the tolerances of the fit between the bearing and bearing bore in the two fork arms. In this instance, there are differences in the pressing forces which as a result of the internal stress in the fork arms results in pretension particularly during the spreading phase which differs sharply from the adjusted spreading distance. This means that the center misalignment of the joint parts can become even greater. The same defect occurs in the case of differences in the peening forces. Without precise pairing of the two parts, which must be done individually for each fork arm before each assembly, these errors are virtually impossible to avoid. Accordingly, good assembly results can be achieved with the prior known methods only under ideal conditions, i.e. when the fork arms are completely free of tolerances between themselves and from fork to fork and when correspondingly tolerance-free bearings are also available. As a practical matter, these conditions are virtually impossible in actual mass production environments.

In accordance with another prior known assembly of the type shown in West German Registered Design No. 1,965,040, the fork arms are spread with the requisite pretensioning force before the bearings are pressed in place and the forks are fixed in this position by means of mechanical elements. This method, therefore, prevents occurrence of differences in the restorative forces in the fork arms resulting from cross sectional and material variations. However, when different pressing or peening forces are required for the bearing, even this prior device has an appreciable reverse effect on the adjusted spread of the fork arms. Consequently, even though better results are obtained with this known device, an intolerable misalignment of the centers can also be anticipated.

SUMMARY OF THE PRESENT INVENTION

With the foregoing in mind, it is an object of the present invention to provide a method of assembling universal joints which is characterized by novel features to produce better results with regard to center misalignments and the bending moment of the joint parts even when joint forks, bearings and bearing bores have the usual variations in manufacturing tolerances.

To this end, the method consists of pressing the bearings in place, then fixing the bearings by means of pressure units, one pressure unit supporting each fork arm and wherein each fork arm is pretensioned individually during the entire pressing and fixing phase by means of the tipping force resulting from the pressure prevailing between the support element and the pressing or peening tool which in turn is reduced by a partial force resulting in response to the amount of the pressing force.

In accordance with the present invention, the apparatus for assembling a universal joint consists of a machine stand with clamping devices for at least one of the joint forks, a pair of pressure units wherein one is associated with each fork arm. Each pressure unit has a hook-like support element supporting the fork arm from behind and a pressing-peening tool. The pressure unit includes a stationary pressure system having a pressure actuated element movable in the direction of movement of the main pressure system which is braced against the machine stand or base.

In accordance with the method and apparatus of the present invention, the essential feature is that the pretension of the fork arms is maintained constant by means of a force which is uniform throughout the entire assembly procedure irrespective of the prevailing pressing or peening force and its effects. Accordingly, tolerance variations between the bearing and bearing bore and manufacturing tolerances of the joint forks, particularly as it applies to cross sectional tolerances, material density, etc., have only an extremely small effect, if any, on the result of the assembly process. Accordingly, universal joints or jointed shafts can be assembled which are center aligned or which have such a small misalignment of their centers that frequently no balancing is necessary. The force applied to the force arms is obtained in accordance with the present invention by a main pressure system for the pressing and peening process itself wherein the lever force of the fork arm acting between the support element and the pressing-peening tool of the pressure unit is utilized. This force is much greater than necessary, particularly during the peening phase and is reduced, for example, to the required value by means of a secondary pressure system provided in each main pressure unit. This reactive effect occurs automatically by reason of the fact that the second pressure system exerts a partial force between the machine stand and the pressure unit in every phase of pressing or peening, this partial force following proportionally the prevailing pressure of the main pressure system and restoring the fork arm to a predetermined desired pretension. In accordance with the present invention, the main and secondary pressure systems are supplied by the same pressure source so that in the final phase of assembling, the forces acting on the two fork arms are substantially equal whereby the joint fork is relieved of any load in its clamped position. Thus, after release of the assembled joint fork, the fork has not only the advantages already discussed but also a bending moment within narrowed tolerances which is predetermined by the pretension of the fork arms.

In accordance with the present invention, the proportional pressure values can be adjusted relative to the main pressure and in this way, the value of the desired pretension and thus, the bending moment, can be selectively varied.

BRIEF DESCRIPTION OF THE DRAWING

These and other objects of the present invention and the various features and details of the operation and construction thereof are hereinafter more fully set forth with reference to the accompanying drawing, wherein: The FIG. is a transverse sectional view of an apparatus for assembling universal joints in accordance with the present invention.

DESCRIPTION OF THE PREFERRED EMBODIMENT

Referring now to the drawing, there is illustrated an apparatus in accordance with the present invention for assembling universal joints. The apparatus comprises a pair of pressure units 2, (only one of which is shown) arranged in a machine stand 1 wherein as illustrated the pressing and peening of a needle bearing 3 in a bearing bore 4 of the joint arm of a joint fork 6 is shown.

As illustrated in the schematic drawing, the joint fork 6 is supported in a fixed clamp 7 forming part of the machine stand 1. A joint cross 8 is inserted into the joint fork 6 by way of pins 9 (only one pin shown) and is positioned and centered there. Needle bearing 3 has already been seated by pressure unit 2 in bearing bore 4 of the fork arm 5 by means of a press fit. The bottom 10 of the cup of the needle roller bearing confronts and engages the end of pin 9 of the joint cross 8. Two fork arms 5 are provided with needle bearings 3 under a predetermined pretension produced by spreading which occurs during the pressing and peening, the friction occurring at this point causes a bending moment between the joint fork 6 and the joint fork 8. After unclamping the pretension of the fork arms 5 produces a restoring force whereby the bottoms 10 of the cups of needle roller bearings 3 are pressed against the end surface of pin 9.

As illustrated, pressure unit 2 comprises a main pressure system 11 and a secondary pressure system 12. The main pressure system 11 has a pressure cylinder 13 and piston 14, the shaft 15 of which is provided with a pressing and peening tool 16. In order to avoid reaction forces from the joint fork 6 and the machine stand 1, the entire pressure unit 2 is free to move in the pressing direction and is provided with a hook-like support element 17 which holds the free end 18 of the fork arm 5 from behind. In this manner the pressing force $F_S$ of the tool 16 and the tensile force $F_A$ of the support element cancel each other out. In order to reduce the amount of spread to the required level, pressure unit 2 is provided with a secondary pressure system 12 which generates a partial force $F_T$ between the machine stand 1 and the main pressure system 11 by way of a piston 19 attached to the machine stand 1. Partial force $F_T$ generated by the secondary pressure system 12 is proportional to the pressing or peening $F_S$ and follows this proportionally in every phase of the assembly operation. This relative value produces the desired pretension of fork arms 5 and can be changed by means of an adjusting element 20. Both pressure units 2 are connected to the same pressure source so that the forces on joint fork 6 cancel each other out and therefore, no load can act on the machine stand by way of clamp 7 of joint fork 6.

What is claimed is:

1. A method for the assembly of universal joints with radially pretensioned fork arms, consisting of the steps of inserting and positioning the joint cross in the joint fork, pressing in the bearing and fixing them by means of pressure units, one of which supports each fork arm and pretensioning each fork arm individually during the entire pressing-in and/or fixing phase by means of the tipping force resulting from the pressure prevailing between the support element and the pressing/peening tool, reduced by a partial force following in response to the amount of the pressing force.

2. A method according to claim 1, including generating a partial force in each case by a secondary pressure system supported against the machine stand.

3. A method according to claim 2, including supplying the two pressure systems from the same pressure source.

4. An apparatus for assembling universal joints consisting of a machine stand (1) with devices (7) for clamping at least one joint fork (6) and a joint cross (8), two pressure units (2), one of which is assigned to each fork arm (5), each pressure unit having a hook-like support element (17) holding the fork arm (5) from behind, and a pressing/peening tool (16), characterized in that the pressure unit (2) includes a secondary pressure system (12), whose pressure-actuated element (19) is movable in the direction of movement of the main pressure system (11) and is braced against the machine stand (1).

5. An apparatus according to claim 4, characterized in that the secondary pressure system (12) is arranged to produce a partial force ($F_T$) in the pressing direction.

6. An apparatus according to claim 5, characterized in that the secondary pressure system (12) has a proportional pressure derived from the main pressure system (11).

7. An apparatus according to claim 6, characterized in that the proportional pressure value is adjustable relative to the main pressure.

* * * * *